June 30, 1970     W. RAUFFER     3,517,597

ZOOM LENS CONTROL MECHANISM

Filed June 18, 1968

INVENTOR.

WALTER RAUFFER

BY *Michael S. Striker*

United States Patent Office 3,517,597
Patented June 30, 1970

3,517,597
ZOOM LENS CONTROL MECHANISM
Walter Rauffer, Munich, Germany, assignor to Agfa-Gevaert Aktiengesellschaft, Leverkusen, Germany
Filed June 18, 1968, Ser. No. 738,065
Claims priority, application Germany, June 30, 1967,
A 27,955
Int. Cl. G03b 3/00
U.S. Cl. 95—45   12 Claims

ABSTRACT OF THE DISCLOSURE

A photographic camera with a zoom lens wherein the movable lens component is reciprocable by a reversible electric motor whose circuit includes two switches. One of the switches is closed when the motor drives the movable lens component to wide angle position and the other switch is closed when the motor drives the movable lens component to telephoto position. The operating mechanism for the switches includes a reciprocable knob rigid with a two-armed trip each arm of which can close one of the switches, and a dial which shares all movements of the knob and whose front face carries symbols visible in or close to the viewfinder. The symbols indicate the directions in which the knob must be moved to close the one or the other switch. Springs are provided to automatically return the knob to a neutral position in which the switches are open.

BACKGROUND OF THE INVENTION

The present invention relates to photographic cameras, and more particularly to improvements in still cameras or motion picture cameras wherein a movable component of the zoom lens is driven by a reversible electric motor.

Cameras, particularly motion picture cameras, with power zoom are known in the art. A drawback of such cameras is that a person looking through the viewfinder cannot immediately determine the direction in which the lever or other operating means for the motor which advances the movable component of the zoom lens must be moved in order to change from close-ups to distant scenes or vice versa. In other words, a person manipulating the camera must divide his or her attention between the viewfinder and a remote second part of the camera in order to insure proper manipulation of the drive for the zoom lens while at the same time observing the scene or subject. This is likely to present serious problems to an inexperienced photographer.

SUMMARY OF THE INVENTION

It is an object of the present invention to provide a novel and improved photographic camera, particularly a motion picture camera, wherein the observation of the viewfinder or of a part immediately adjacent to the viewfinder suffices to inform the operator as to the direciton in which the operating means for the drive of the zoom lens must be moved in order to change from close-up shots to shots of distant scenes or vice versa.

Another object of the invention is to provide a novel and improved switching arrangement which can be used to control the operation of a reversible motor for the movable component of a zoom lens in a photographic camera.

The camera of my invention comprises a housing and a zoom lens having a movable lens component which is reciprocable by a reversible electric motor. The circuit of the motor comprises switch means including movable means movable between first and second positions to respectively effect rotation of the motor in first and second directions, and operating means comprising handgrip means movable between first and second positions, actuating means connected with the handgrip means and arranged to respectively move the movable means of the switching arrangement to first and second positions in response to movement of the handgrip means to corresponding positions, and indicating means connected with the handgrip means and having symbols indicating the direction in which the handgrip means is to be moved to its positions. The camera further comprises an observation window positioned to permit observation of the indicating means; such window may be a separate window provided for the indicating means close to the viewfinder or it may form part of the viewfinder. It is also possible to reflect the image of the indicating means into the viewfinder or into a special window adjacent to the viewfinder.

The novel features which are considered as characteristic of the invention are set forth in particular in the appended claims. The improved photographic camera itself, however, both as to its construction and its mode of operation, together with additional features and advantages thereof, will be best understood upon perusal of the following detailed description of a specific embodiment with reference to the accompanying drawing.

DESCRIPTION OF THE PREFERRED EMBODIMENT

Figure 2:
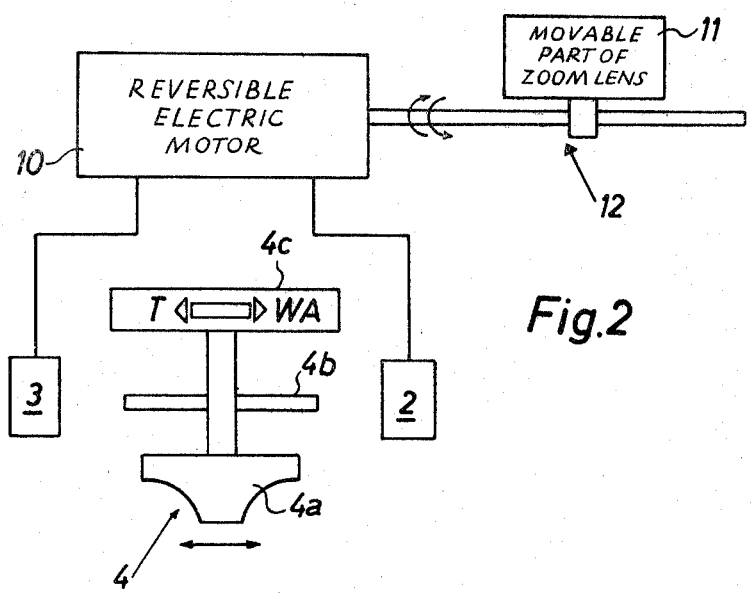
FIG. 2 is a diagram showing the operating means, the motor and the movable component of the zoom lens.

Referring first to FIG. 2, there is shown a portion of a motion picture camera including a reversible electric motor 10 which can move a movable component 11 of the zoom lens back and forth in directions indicated by a double-headed arrow. The transmission which drives the lens component 11 is indicated by the numeral 12; it may comprise a feed screw which is driven by the motor 10 to rotate in two directions and a spindle nut meshing with the feed screw and operatively connected with the lens component 11.

The electric circuit of the motor 10 comprises a switching arrangement including two electric switches 2 and 3. Each of these switches comprises a first contact 2a, 3a (FIG. 1) and a movable second contact 2b, 3b. The contacts 2b, 3b are disposed between the contacts 2a, 3a and are spaced from each other. The motor 10 and the switching arrangement are accommodated in a housing 1 which further accommodates a viewfinder having a window 8 through which the user of the camera can observe the subject or scene. The switch 2 is arranged to complete the motor circuit for the purpose of moving the lens component 11 to the wide angle position and the switch 3 is closed when the motor 10 should move the lens component 11 to the telephoto position. When the lens component 11 is moved to a neutral or median position, the lens system of the camera acts as a normal objective.

The operating means 4 for the switches 2 and 3 comprises a handgrip member or knob 4a which has a stem 4A extending inwardly through a slot 1A of the housing 1 and carries an actuating means or trip 4b and an indicating means or dial 4c. The actuating means or trip 4b comprises two arms which are disposed between the movable contacts 2b, 3b and are guided by eyes 1c, 1d provided on and extending into the interior of the housing 1. The eyes 1c, 1d have holes 1a, 1b through which the arms of the trip 4b extend. Helical springs 5, 6 operate between the eyes 1d, 1c and the stem 4A to bias the operating means 4 to the neutral position shown in FIG. 1. The springs 6, 5 respectively surround the left-hand and right-hand arms of the trip 4b. The bias of the spring 6 approximates or equals the bias of the spring 5 so that the operating means 4 automatically returns to the illustrated neutral position as soon as the knob 4a is released to thereby maintain the arms of the trip 4b away from the movable contacts 2b, 3b.

Figure 1:
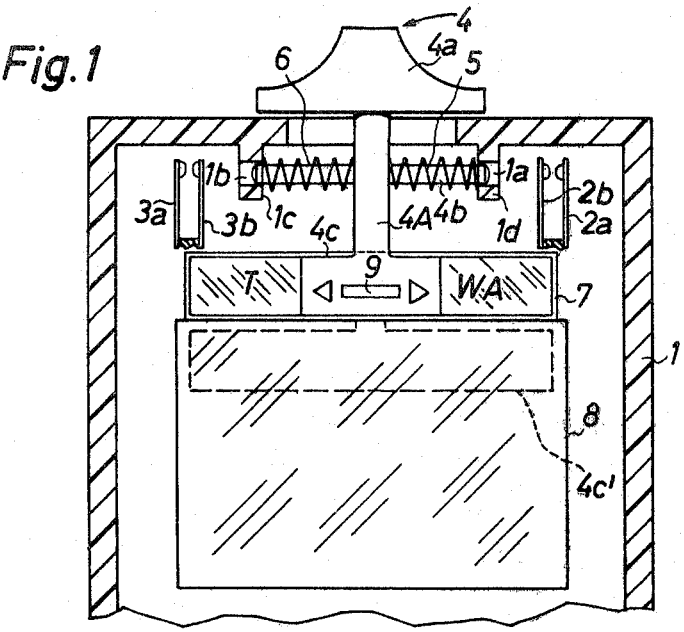
FIG. 1 is an enlarged fragmentary sectional view of a photographic camera which embodies the invention.

The dial 4c resembles a plate which extends to both sides of the stem 4A and is located behind a window 7 which is preferably closely adjacent to the window 8 of the viewfinder. If desired, the window 7 can be omitted and the dial 4c is then located directly behind a portion of the window 8 as indicated in FIG. 1 by broken lines, as at 4c'. It is clear that the stem 4A is then replaced by a somewhat longer stem or that the entire operating means 4 is mounted at a point closer to the viewfinder. It is also possible to omit the window 7 and to place into the housing 1 a suitable mirror which reflects the image of the dial 4c into the viewfinder. All that counts is to install the dial 4c in a position in which it (or its image) can be observed through or at a point close to the viewfinder. The window 7 can be placed at a level above or below the viewfinder window 8. The symbols provided on the front face of the dial 4c include a double-headed arrow 9 whose heads point toward the opposite ends of the dial and two inscriptions WA (wide angle) and T (telephoto). It will be noted that the right-hand head of the arrow 9 points in the direction in which the knob 4a must be moved in order to close the switch 2 by way of the right-hand arm of the trip 4b and that the left-hand head of the arrow 9 points in the direction in which the knob must be moved in order to effect closing of the switch 3 by way of the left-hand arm of the trip 4b.

The operating means 4 is guided in the slot 1A and in the holes 1b, 1c of the housing 1. When the user wishes to move the lens component 11 to the wide angle position, the knob 4a is pushed in a direction to the right. The operator immediately knows the direction in which the knob 4a must be pushed in order to move the lens component 11 to the wide angle position because he or she can look into the window 7 and sees that the right-hand head of the arrow 9 points toward the symbol WA. On the other hand, and if the user wishes to move the component 11 to the telephoto position he or she knows immediately that the knob 4a must be pushed to the left, as viewed in FIG. 1, because the left-hand head of the arrow 9 points toward the symbol T. The dial 4c (with all of its symbols) shares reciprocatory movements of the knob 4a and trip 4b. If the knob 4a is released, the springs 5, 6 automatically return the operating means 4 to the neutral position of FIG. 1 whereby the switches 2 and 3 open.

The improved camera and the arrangement of FIG. 1 are susceptible of many additional modifications. As stated before, and particularly when the operating means 4 is remote from the view finder, the image of the front face of the dial 4c can be reflected into the window 8 by one or more mirrors. Also, the switches 2, 3 can be mounted in different positions as long as the actuating means of the operating means closes one of the switches in response to movement to a first position and the other switch in response to movement to a second position, as long as the dial 4c or an analogous dial shares the movements of the actuating means, and as long as the dial or its image can be observed in or close to the viewfinder so that the user of the camera need not divide his or her attention between the viewfinder and the indicating means which points out the directions in which the operating means must be manipulated in order to move a component of the zoom lens to wide angle or telephoto position.

An important advantage of the improved operating means 4 is its relatively low cost. Such operating means may be made of plastic and the dial 4c may be located in a common plane with the actuating means 4b and knob 4a. The guide means 1c, 1d may but need not form integral parts of the housing 1.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. In a photographic camera, particularly in a camera having a zoom lens, reversible electric motor means; a switching arrangement operatively connected with said motor means and having movable means movable between first and second positions to respectively effect rotation of said motor means in first and second directions; operating means comprising handgrip means movable between first and second positions, actuating means connected with said handgrip means and arranged to respectively move said movable means to said first and second positions in response to movement of said handgrip means to corresponding positions, and indicating means connected with said handgrip means and having symbols indicating the directions in which said handgrip means is to be moved to said positions thereof; and an observation window positioned to permit observation of said indicating means.

2. A structure as defined in claim 1, wherein said window forms part of a viewfinder.

3. A structure as defined in claim 1, further comprising viewfinder means having a second window adjacent to said first mentioned window so that both said windows can be observed simultaneously.

4. A structure as defined in claim 1, wherein said switching arrangement comprises a pair of switches each having a first contact and said movable means comprises a pair of movable contacts each associated with one of said first contacts, one of said movable contacts engaging the respective first contact in each position of said movable means.

5. A structure as defined in claim 4, wherein said handgrip means is reciprocable between said positions thereof and said indicating means comprises a dial rigid with said handgrip means, said dial extending in the direction of reciprocation of said handgrip means.

6. A structure as defined in claim 5, wherein said actuating means comprises an actuating member disposed between said movable contacts and being substantially parallel to said dial.

7. A structure as defined in claim 6, further comprising biasing means for urging said handgrip means to a neutral position substantially midway between said first and second positions, said switches being open in said neutral position of said handgrip means.

8. A structure as defined in claim 7, wherein said biasing means comprises a pair of symmetrical springs.

9. A structure as defined in claim 5, further comprising a housing having guide means for said operating means.

10. A structure as defined in claim 9, wherein said actuating means comprises a pair of arms and said guide means comprises a separate guide for each of said arms.

11. A structure as defined in claim 1, wherein said arrangement comprises a pair of switches each having a first contact and a second contact, said second contacts constituting said movable means and being disposed between said first contacts, said handgrip means being reciprocable between said first and second positions thereof and having a stem disposed between said second contacts, said actuating means comprising a pair of arms extending from said stem and one thereof being arranged to move one of said second contacts against the corresponding first contact to close the respective switch in each position of said handgrip means, said indicating means comprising a plate-like dial connected with said stem and further comprising a housing for said operating means providing with guide means for said arms, and resilient means operating between said stem and said housing to bias said handgrip means to a neutral position between said first and second positions thereof, each of said switches being open in the neutral position of said handgrip means.

12. A structure as defined in claim 11, wherein said symbols include a double-headed arrow and inscriptions indicating the respective positions of said handgrip means.

References Cited

UNITED STATES PATENTS

| 2,995,061 | 8/1961 | Briskin et al. | 95—45 |
| 3,126,446 | 3/1964 | Blancha | 95—45 X |
| 3,209,367 | 9/1965 | Heden | 95—45 X |
| 3,324,780 | 6/1967 | Miyauchi | 95—45 |

FOREIGN PATENTS

| 1,187,121 | 2/1965 | Germany. |

NORTON ANSHER, Primary Examiner

R. M. SHEER, Assistant Examiner

U.S. Cl. X.R.

352—140